United States Patent [19]
Tromeur et al.

[11] Patent Number: 5,969,239
[45] Date of Patent: Oct. 19, 1999

[54] DEVICE FOR MONITORING THE TIRES OF A VEHICLE WITH ELECTROMAGNETICALLY COUPLED ANTENNAS

[75] Inventors: Xavier Tromeur, Artonne; André Meunier, Lempdes, both of France

[73] Assignee: Compagnie Generale des Etablissments Michelin - Michelin & CIE, France

[21] Appl. No.: 08/902,605

[22] Filed: Aug. 1, 1997

Related U.S. Application Data

[63] Continuation of application No. 08/690,959, Aug. 1, 1996, abandoned.

[30] Foreign Application Priority Data

Aug. 8, 1995 [FR] France .................................. 95 09706

[51] Int. Cl.$^6$ .................................................. B60C 23/02
[52] U.S. Cl. ........................................ 73/146.5; 340/443
[58] Field of Search ................................ 73/146.2, 146.3, 73/146.5, 146.8; 340/442, 443, 444, 445, 448

[56] References Cited

U.S. PATENT DOCUMENTS

| | | | |
|---|---|---|---|
| 3,881,170 | 4/1975 | Hosaka et al. | 73/146.5 |
| 3,895,347 | 7/1975 | Takusagawa et al. | 340/58 |
| 4,749,993 | 6/1988 | Szabo et al. | 340/870.31 |
| 5,033,295 | 7/1991 | Schmid et al. | 73/146.5 |
| 5,181,975 | 1/1993 | Pollack et al. | 152/152.1 |
| 5,193,387 | 3/1993 | Hodate | 73/146.5 |
| 5,235,850 | 8/1993 | Schurmann | 73/146.5 |
| 5,473,938 | 12/1995 | Handfield et al. | 73/146.5 |
| 5,583,482 | 12/1996 | Chamussy et al. | 340/442 |

FOREIGN PATENT DOCUMENTS

| | | | |
|---|---|---|---|
| WO 87/03545 | 6/1987 | European Pat. Off. | 73/146.5 |
| 2504675 | 10/1982 | France . | |
| 3027059A1 | 2/1982 | Germany . | |
| 3801278A1 | 7/1989 | Germany . | |

OTHER PUBLICATIONS

Rapport de Recherche Preliminaire, (Apr. 23, 1996 Search Report).

*Primary Examiner*—William Oen
*Attorney, Agent, or Firm*—Alan A. Csontos; Robert R. Reed

[57] ABSTRACT

Device for monitoring the tires of a vehicle, comprised of a central unit and for each wheel a measurement sensor, a rotating antenna, a stationary antenna, and metallic parts of electromagnetic coupling placed in the environment of the wheel, the hub, and the spindle.

7 Claims, 3 Drawing Sheets

DEVICE FOR MONITORING THE TIRES OF A VEHICLE WITH ELECTROMAGNETICALLY COUPLED ANTENNAS

This application is a continuation of application Ser. No. 08/690,959 filed on Aug. 1, 1996, now abandoned.

BACKGROUND OF THE INVENTION

The present invention concerns a device for monitoring the tires of a vehicle, and more precisely a device comprised of, for each wheel, an electromechanical module connected to a rotating antenna, and, coupled to the latter, a stationary antenna connected to a central unit of the vehicle.

It is known that monitoring the pressure and temperature of tires is essential for proper safety; in addition, if this monitoring is done continuously during utilization of the vehicle, added to increased safety is an extension of the service life of the tires, a decrease in consumption of fuel, an improvement in road-holding and comfort, etc.

The requester has developed over about the last ten years such a system of continuous monitoring, known under the name of "MTM" ("Michelin Tire Monitor"), which has proven itself in some very harsh automobile races. Briefly, this system is composed of a central unit powered by the battery of the vehicle, this unit being connected, for each wheel, to a stationary antenna; on each of the wheels is mounted a rotating antenna connected to a module comprised of a pressure sensor as well as a temperature sensor; electromagnetic coupling is established between the antennas in pairs; this coupling allows on the one hand to transmit energy from the central unit to each wheel module and, on the other hand, to transmit to the central unit the signals gathered from each sensor, these exchanges being made continuously according to specific rates.

This basic system has already given rise to improvements and adaptations. For example, patent FR 2 706 811 describes the case of a truck equipped with wheels mounted in single and duals, on which one of the lug nuts is used to connect the sensor of tire pressure and the wheel module to the rotating antenna.

We can also cite patent U.S. Pat. No. 5,235,850 (Texas Instruments) which implements for each wheel to be monitored a rotating part (rotor) connected to the measurement sensors, and a stationary part (stator) connected to a central unit, these parts being coupled by two rotating and stationary antennas of which one is annular.

But these known systems all present a disadvantage: they require a rotating annular antenna comprised of an annular coil made to measure for each type of wheel, which complicates the installation of these monitoring devices and which greatly increases their cost. The requester has therefore had the unexpected idea of eliminating the annular coil from this rotating antenna.

SUMMARY OF THE INVENTION

In accordance with the invention, a device for monitoring the tires of a vehicle is such that it is comprised of a central unit and for each wheel:

a measurement sensor mechanically attached to the wheel;

a rotating antenna connected galvanically to the measurement sensor, firmly attached to the wheel and integrated with the measurement sensor in one small box;

a stationary antenna firmly attached to the spindle of said wheel, connected electrically to the central unit; and metallic coupling parts placed in the environment of the wheel, the hub and the spindle and electromagnetically coupling the stationary and rotating antennas;

the central unit supplying energy to the sensors and analyzing the measurement signals from said sensors.

In a preferred variant of the invention, the metallic coupling parts are comprised of a closed circular metallic part coaxial with the wheel and placed opposite said fixed and rotating antennas such that any variation in the magnetic flow produced by one of the said antennas leads to the appearance of an electric current in the said closed circular metallic part, and vice versa.

Such a metallic coupling part can advantageously be strip-iron.

When the rim is metallic, the metallic coupling part can be laid against the radially interior surface of the rim; and, the rotating antenna including a coil, the metallic coupling part can be placed radially on the Interior or exterior relative to the coil.

According to the invention, when the rim is composed of an insulating material, the metallic coupling part can be placed against its radially exterior surface; the metallic coupling part can also be placed on the very interior of the thickness of the rim.

Without straying from the scope of the invention, the metallic parts of electromagnetic coupling can be comprised of metallic parts of the wheel, the tire, the hub, the spindle, and/or other mechanical parts of the vehicle.

In particular, the metallic parts of electromagnetic coupling can be comprised of the beads of the tires.

BRIEF DESCRIPTION OF THE DRAWINGS

The invention will be better understood using the description of various examples which will follow, given non-restrictively, by referring to the attached drawing on which.

DETAILED DESCRIPTION OF THE PREFERRED EMBODIMENTS

Figure 1:
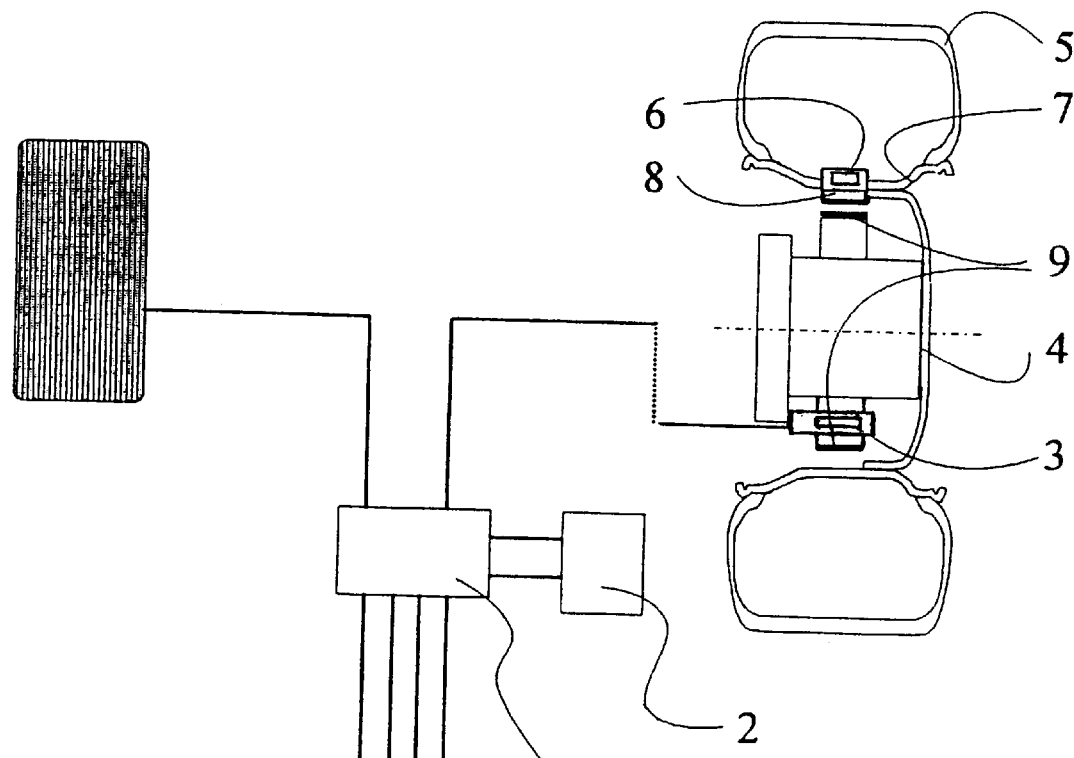
FIG. 1 is a schematic view of the fitting of a passenger vehicle with the monitoring device, subject of the invention, one part of the figure being drawn at a larger scale to facilitate its description.

The equipment for a passenger vehicle with the monitoring device, subject of the invention (FIG. 1) includes first of all a central unit 1 supplied with electricity by battery 2; this central unit is connected electrically to four stationary antennas such as 3, mounted on spindles (stationary) of each of the wheels 4. Each wheel, equipped with a tire 5, has a measurement sensor 6 mounted on the rim 7 of the wheel 4 and firmly attached to a rotating antenna 8. The rotating antenna 8 and the measurement sensor 6 are integrated in one small box. The stationary antennas 3 and rotating antennas 8, in pairs, are coupled electromagnetically by a metallic circular strip 9 attached to the wheel, and here, on a radially interior wall of the rim 7. The strip is attached such that it remains electrically insulated from the metallic wheel. The strip 9 has the advantage of being very flat and can therefore be easily implanted on the wheel. But, it can also be replaced by a metallic part of different geometry provided that this part is circular and closed.

Figure 2:
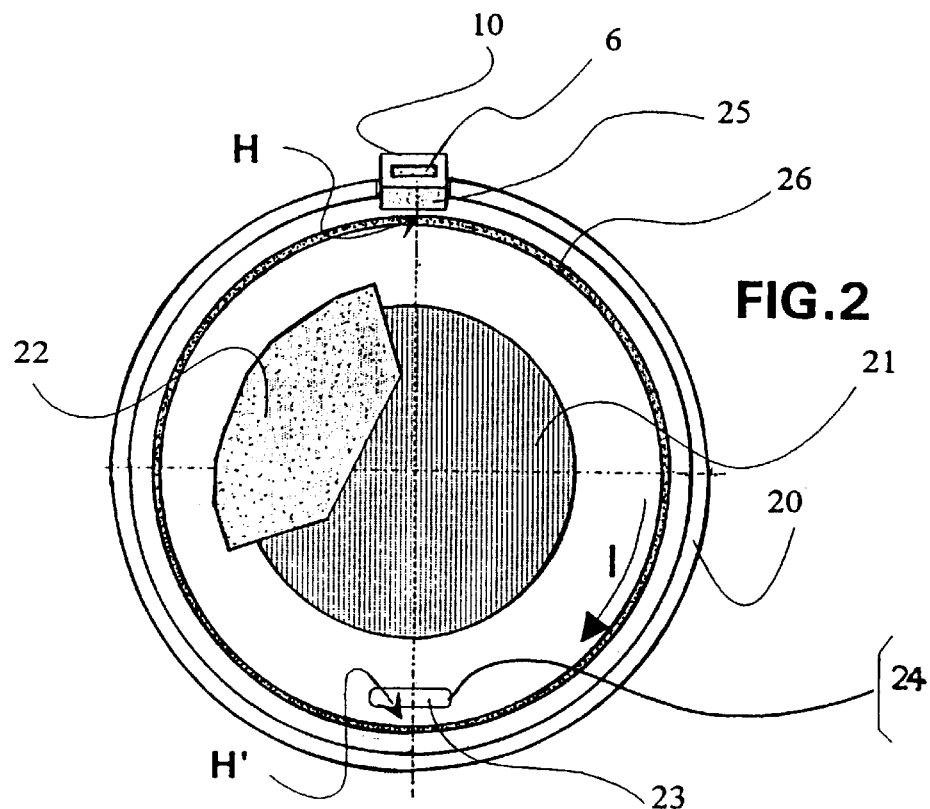
FIG. 2 is a schematic view of a wheel equipped with the annular strip according to the invention.

The role of the ring of strip iron according to the Invention will be explained hereafter by referring to FIG. 2: we see the rim 20, the hub 21, the brake caliper 22 and a pair of coupled antennas, the rotating antenna 25, composed of a first coil, mounted on rim 20 and the stationary antenna 23 composed of a second coil, connected electrically to the central unit 24. The coils of each of the stationary and mobile antennas are the center of concomitant variations of potential: that of the stationary antenna at the time of the transfer of energy, and that of the rotating antenna at the time of the transmission of the signals; these variations of potentials produce magnetic fields H, advantageously channeled by ferrite cores as will be described below; variations in flow of these magnetic fields on the interior of the closed metallic ring 26 create electric currents I; variations of the latter produce in turn variations of magnetic field H' which, conversely, create variations of potential in the coil of the other antenna.

Figure 4:
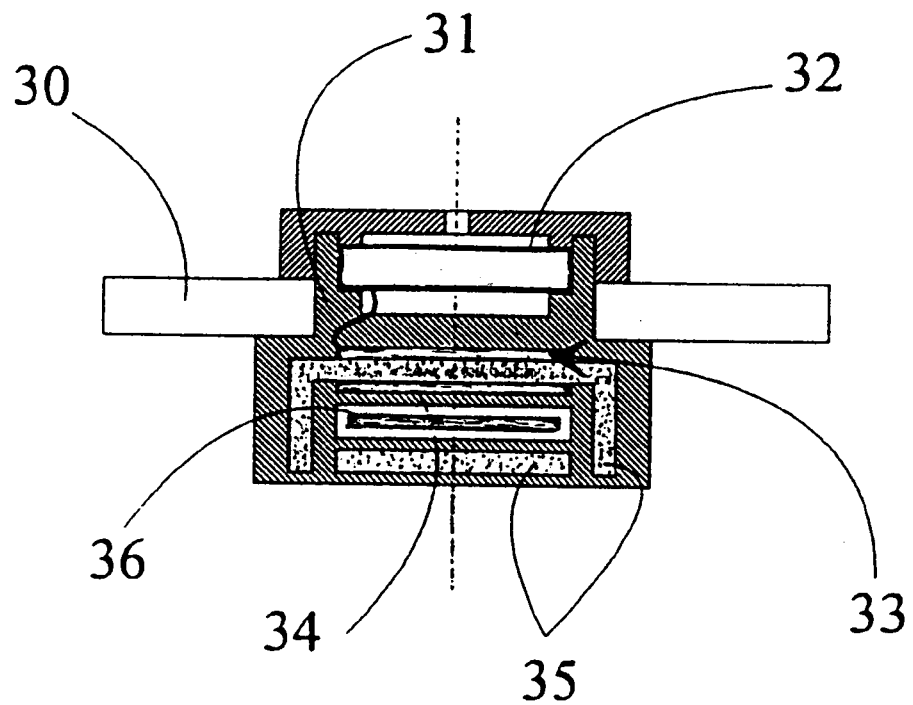
FIGS. 4 and 5 are more detailed section views of the measurement box, the antennas and the strip.
Figure 5:
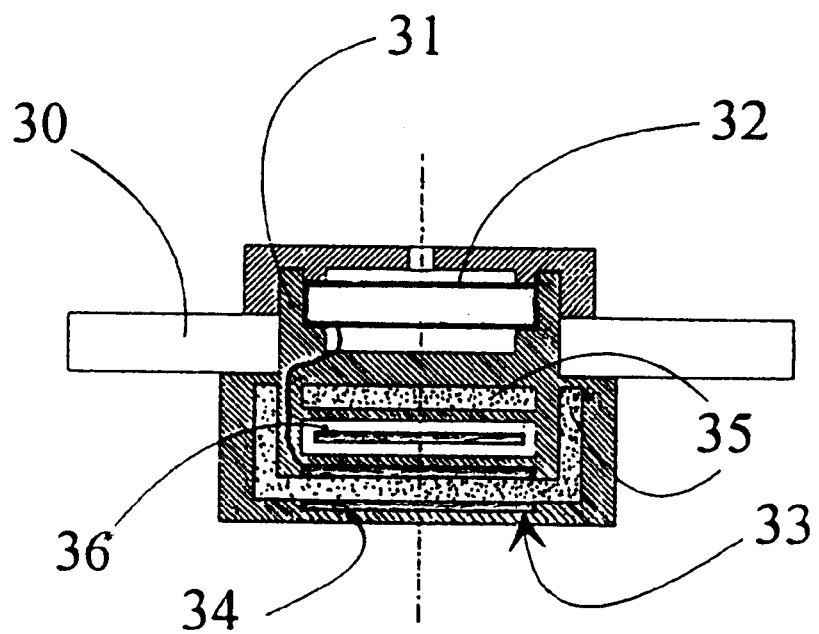

By referring to FIGS. 4 and 5, we will describe in more detail the measurement box, the antennas and the strip iron: we see the rim 30 of the wheel, with an opening to receive in an airtight manner a small box 31 containing a measurement sensor 32 in communication with the interior of the tire; this box also integrates the rotating antenna 33 comprised of a coil 34 and a magnetic core 35 formed from one or several pieces of ferrite; finally, the annular metallic strip 36 takes its place in a housing located radially on the interior (FIG. 4), or on the exterior (FIG. 5) relative to the coil 34.

Figure 3:
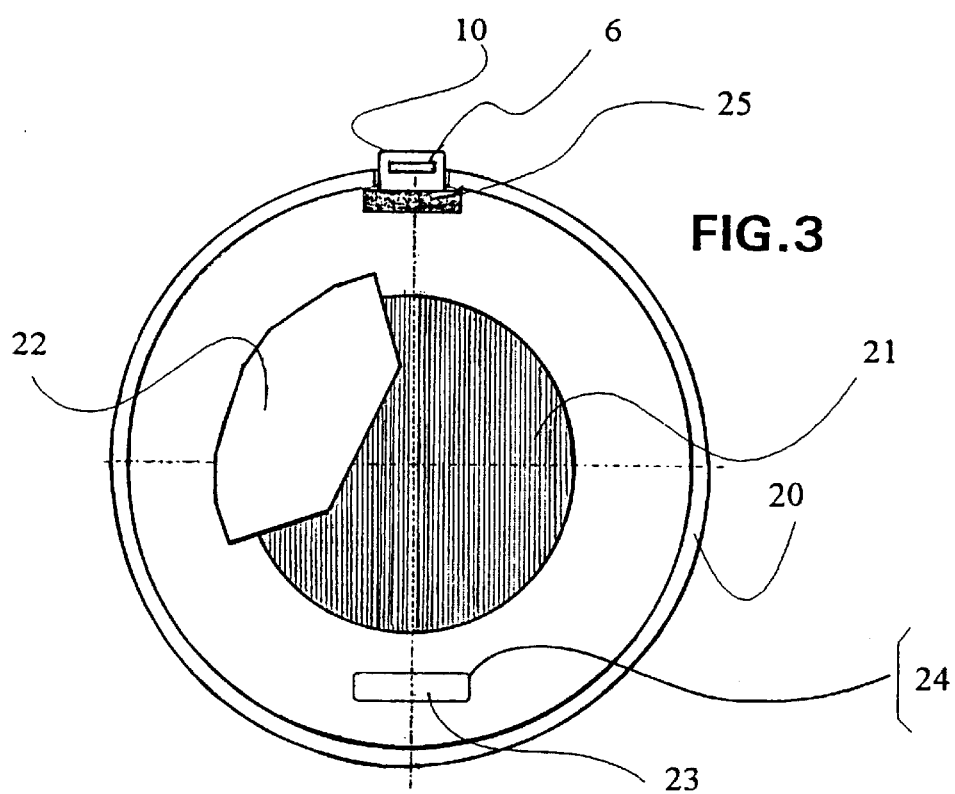
FIG. 3 is a schematic view of a wheel without said strip.

Without straying from the scope of the invention, we can also remove the ring of strip iron; this variant (FIG. 3) presents a major advantage: it allows for simplifying the installation, to make it lighter and to reduce its cost The electromagnetic transmission between the two antennas is then done by using their metallic "environment", i.e., all of the neighboring mechanical parts, such as the hub, the spindle, the brake caliper, the wheel, the tire etc. The transmission might then be less steady over time because it is dependent on the relative positions of the two antennas (one of which is rotating with the wheel), but various adaptations allow for minimizing this disadvantage if necessary.

First of all, a simple regulator of power allows for reducing these cyclical variations considerably. Next, we can modify the locations of the antennas to make them less sensitive to variations in their relative positions: thus, each time that the positions of the mechanical parts, particularly the brakes, allows it, the two antennas are placed as close as possible to the axis of the wheel.

But a very interesting variant of the invention consists of positioning the antennas such that their electromagnetic "environment" includes at least one of the metallic beads of the tires mounted on the wheels. Thus, the beads play the same role as the rings of strip iron described above, but without necessitating the addition of supplementary elements to the wheel.

The frequency utilized for the transmissions between the antennas is from 30 to 100 kilohertz.

Of course, other technological variants are possible without departing from the scope of the present invention, and the examples which have been described above have permitted illustrating some of them.

We claim:

1. Device for monitoring the tires of a vehicle, comprising a central unit and for each wheel:
   a measurement sensor attached mechanically to the wheel;
   a rotating antenna connected galvanically to the measurement sensor, firmly attached to the wheel, and integrated with the measurement sensor in a single small box;
   a stationary antenna firmly attached to a spindle of said wheel, and connected electrically to the central unit; and
   a closed circular strip-iron coupling ring coaxial with the wheel and placed opposite said stationary antenna and said rotating antenna such that any variation of magnetic flow produced by one of said antennas leads to the appearance of an electrical current in said coupling ring, and vice versa;
   the central unit supplying energy to said sensors and analyzing measurement signals of said sensors.

2. Device according to claim 1, in which, said wheel having a metallic rim, the coupling ring is placed along the radially interior surface of said metallic rim.

3. Device according to claim 1, wherein, the rotating antenna including a coil, the coupling ring is placed radially interior relative to this coil of the rotating antenna.

4. Device according to claim 1, wherein, the rotating antenna including a coil, the coupling ring is placed radially exterior relative to this coil of the rotating antenna.

5. Device according to claim 1, wherein the coupling ring is placed against the radially exterior surface of the rim, the latter being comprised of an insulating material.

6. Device according to claim 1, wherein, the rim being comprised of an insulating material, the coupling ring is placed on the very interior of the thickness of the rim.

7. Device according to claim 1, in which the frequency of transmissions between the antennas is from 30 to 100 kilohertz.

* * * * *